United States Patent
Rojas et al.

(10) Patent No.: US 9,903,147 B2
(45) Date of Patent: Feb. 27, 2018

(54) MOTOR VEHICLE DOOR WITH TWO WINDOWS AND INDEPENDENT WINDOW DRIVE SYSTEM

(71) Applicant: FORD GLOBAL TECHNOLOGIES, LLC, Dearborn, MI (US)

(72) Inventors: Victor Daniel Rojas, Detroit, MI (US); Donald P. Iacovoni, Plymouth, MI (US); Paul L. Heirtzler, Jr., Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/997,881

(22) Filed: Jan. 18, 2016

(65) Prior Publication Data

US 2017/0204648 A1 Jul. 20, 2017

(51) Int. Cl.
  *E05D 15/00* (2006.01)
  *E05F 15/603* (2015.01)
  *B60J 1/16* (2006.01)

(52) U.S. Cl.
  CPC ............. *E05F 15/603* (2015.01); *B60J 1/16* (2013.01); *E05Y 2900/55* (2013.01)

(58) Field of Classification Search
  CPC ........ E05F 15/603; B60J 1/16; E05Y 2900/55
  USPC .......... 49/349, 142, 143, 144, 145, 146, 207
  See application file for complete search history.

(56) References Cited

U.S. PATENT DOCUMENTS

| | | | | |
|---|---|---|---|---|
| 2,022,423 A * | 11/1935 | Knapp | ................. | E05F 11/382 49/146 |
| 2,030,089 A * | 2/1936 | Anderson | ............. | E05F 11/382 296/96.11 |
| 2,122,963 A * | 7/1938 | Susor | ......................... | B60J 1/14 49/103 |
| 2,152,055 A * | 3/1939 | Kegler | ................ | E05F 11/382 49/103 |
| 2,253,805 A * | 8/1941 | Olivier | .................. | E05F 11/382 49/145 |
| 2,658,791 A * | 11/1953 | Anderson | ................. | B60J 1/14 49/144 |
| 2,828,999 A * | 4/1958 | Schamel | ............... | E05F 11/382 296/149 |
| 2,863,658 A * | 12/1958 | Moyes | .................. | E05F 11/382 49/144 |
| 2,955,817 A * | 10/1960 | Campbell | ............. | E05F 11/445 49/103 |
| 3,024,062 A * | 3/1962 | Himka | .................. | E05F 15/689 296/155 |
| 3,659,381 A * | 5/1972 | Frey | ..................... | E05F 11/382 49/103 |
| 3,670,454 A * | 6/1972 | Gebhard | ............... | E05F 11/382 49/103 |
| 3,733,748 A * | 5/1973 | Heesch | ................. | E05F 11/382 49/103 |

(Continued)

FOREIGN PATENT DOCUMENTS

WO 2011014684 A1 2/2011

*Primary Examiner* — Jerry Redman
(74) *Attorney, Agent, or Firm* — Jason Rogers; King & Schickli, PLLC

(57) ABSTRACT

A motor vehicle door includes a door body and first and second windows carried on that door body. A window drive system independently displaces the first and second windows between closed and opened positions. A related method is also provided.

10 Claims, 10 Drawing Sheets

(56) References Cited

U.S. PATENT DOCUMENTS

| | | | | |
|---|---|---|---|---|
| 3,745,703 A * | 7/1973 | Francis | E05F 11/382 | 49/103 |
| 3,782,037 A * | 1/1974 | Heesch | E05F 11/382 | 49/103 |
| 3,788,005 A * | 1/1974 | Mistopoulos, Jr. | E05F 11/445 | 49/103 |
| 3,816,962 A * | 6/1974 | Ladd | E05F 11/382 | 49/103 |
| 3,816,963 A * | 6/1974 | Hartmeyer | E05F 11/382 | 49/103 |
| 3,859,753 A * | 1/1975 | Marcuzzi | E05F 11/382 | 49/103 |
| 3,900,965 A * | 8/1975 | Mummert | E05F 11/382 | 49/103 |
| 3,965,618 A * | 6/1976 | Pickles | E05F 11/382 | 49/103 |
| 4,000,581 A * | 1/1977 | Fukumoto | E05F 11/382 | 49/103 |
| 4,020,593 A * | 5/1977 | Salomon | E05F 11/382 | 49/103 |
| 4,304,434 A | 12/1981 | Suzuki et al. | | |
| 4,502,248 A * | 3/1985 | Thomas, Jr. | B60J 1/17 | 49/374 |
| 4,571,888 A * | 2/1986 | Jensen | E05C 17/60 | 49/374 |
| 4,776,630 A * | 10/1988 | Fukutomi | B60J 7/028 | 296/107.17 |
| 4,796,943 A | 1/1989 | Fukutomi et al. | | |
| 4,811,517 A * | 3/1989 | Eckert | B60J 1/17 | 49/103 |
| 4,842,327 A * | 6/1989 | Hennessy | B60J 1/14 | 296/107.04 |
| 5,685,596 A * | 11/1997 | Tokarz | B60J 1/14 | 296/107.07 |
| 6,419,295 B1 | 7/2002 | Neubrand | | |
| 6,729,672 B2 | 5/2004 | Neubrand | | |
| 6,803,733 B1 * | 10/2004 | Shabana | E05F 11/486 | 296/146.11 |
| 7,857,373 B2 | 12/2010 | Dilluvio et al. | | |
| 8,333,423 B2 * | 12/2012 | Gulker | B60J 1/17 | 296/180.1 |
| 8,727,419 B2 * | 5/2014 | Syvret | B60J 1/17 | 296/146.2 |

\* cited by examiner

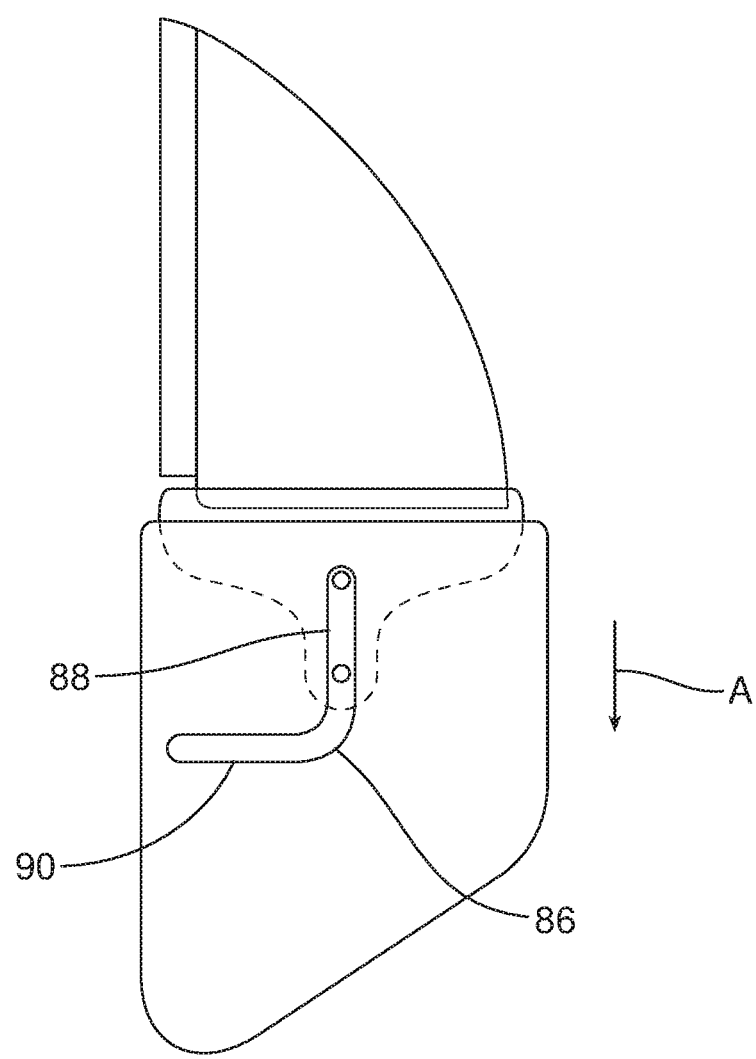

MOTOR VEHICLE DOOR WITH TWO WINDOWS AND INDEPENDENT WINDOW DRIVE SYSTEM

TECHNICAL FIELD

This document relates generally to the motor vehicle equipment field and, more particularly, to a motor vehicle door including fully opening independent rear side and quarter windows.

BACKGROUND

In motor vehicle applications, there are challenges with designing movable windows or door glass to drop inside of the door structure. Often the shape of the lower door structure does not accommodate the complete lowering of a full door glass window using traditional automotive hardware systems. This is typically an issue on rear side doors, where the location of the rear wheel well might necessitate a certain shape and size of the lower door structure that is smaller than desired, or on a front door with an outside rearview mirror that is not mounted above the beltline.

In the past, this problem has generally been resolved by one of two compromises. In the first of these compromises, illustrated in FIG. 1A, the window or door glass W does not drop completely below the beltline B found on the door at the lower side of the window frame. In this situation, the vehicle occupant does not have a comfortable place to rest his arm when the window is down. Further, there is only limited room to pass items through the opening O above the window and the portion of the opening remaining covered by the window significantly limits available ventilation.

In option number two, illustrated in FIG. 1B, the size of the movable portion of the window or door glass W is reduced so that portion may be fully opened and dropped into the door panel P. Unfortunately, this compromise increases the cost and complexity of the window system due to, for example, the addition of a fixed piece of glass G and the division bar seal S or an applique that blocks a portion of the daylight opening.

This document relates to a new and improved window regulator for a door of a motor vehicle allowing for the full independent lowering of both a side window and a quarter window into the door panel, while avoiding the compromises identified above.

SUMMARY

In accordance with the purposes and benefits described herein, a motor vehicle door is provided. That motor vehicle door includes a door body, a first window carried on the door body and a second window carried on the door body. Further, the motor vehicle door includes a window drive system for independently displacing the first window and the second window between closed and opened positions.

In one possible embodiment, the first and second windows are frameless. In one possible embodiment, the first and second windows are fully concealed within the door body when in the fully opened position.

In at least one embodiment, the window drive system includes a first drive motor and a first actuator connected to the first window and a second drive motor and a second actuator connected to the second window. That first window may be a side window and the second window may be a quarter window located adjacent to and vehicle rearward of the side window on the motor vehicle door.

In one possible embodiment, the window drive system further includes a pivot about which the second window pivots when displaced between the closed position and the opened position. A linkage is provided between the second drive motor and the second window. In one possible embodiment, that linkage includes a gear drive. In another possible embodiment, that linkage includes a slider crank connected between the second drive motor and a slot carried on the second window. In one possible embodiment, the linkage includes a flexible drive element selected from a group consisting of a cable, a belt or a chain.

In one possible embodiment, the window drive system includes a first guide track and follower subsystem for the first window. The first guide track and follower subsystem guides the first window while the first window is being displaced by the first drive motor between the closed position and the opened position.

In one possible embodiment, the window drive system includes a second guide track and follower subsystem for the second window. That second guide track and follower subsystem guides the second window while the second window is being displaced by the second drive motor between the closed position and the opened position.

In at least one possible embodiment, the second guide track and follower subsystem includes at least one guide track fixed to the door body and a first follower and a second follower that are carried on the second window and slide along the at least one guide track as the second window is displaced by the second drive motor between a closed position and the opened position. The at least one guide track may comprise a single guide track and the first follower and the second follower may both slide along that same fixed guide track.

In accordance with yet another aspect, a method is provided for improving rear seat ventilation options in a motor vehicle. That method may be described as including the steps of equipping a rear door of the motor vehicle with a side window and a quarter window and providing a window drive system for independently opening and closing the side window and the quarter window.

That method may further include the step of opening the side window while maintaining the quarter window closed. Further, that method may include the step of opening the quarter window while maintaining the side window closed.

In addition, the method may include the step of fully concealing the quarter window within a body of the rear door when in a fully opened position. Further the method may include the step of fully concealing the side window within the body of the rear door when in the fully opened position.

In the following description, there are shown and described several preferred embodiments of the motor vehicle door. As it should be realized, the motor vehicle door is capable of other, different embodiments and its several details are capable of modification in various, obvious aspects all without departing from the motor vehicle door as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the motor vehicle door and together with the description serve to explain certain principles thereof. In the drawing figures:

FIG. 5B is a schematic side elevational view of the alternative embodiment illustrated in FIG. 5A with the second window in the closed position.

Reference will now be made in detail to the present preferred embodiments of the motor vehicle door, examples of which are illustrated in the accompanying drawing figures.

DETAILED DESCRIPTION

Figure 1A:
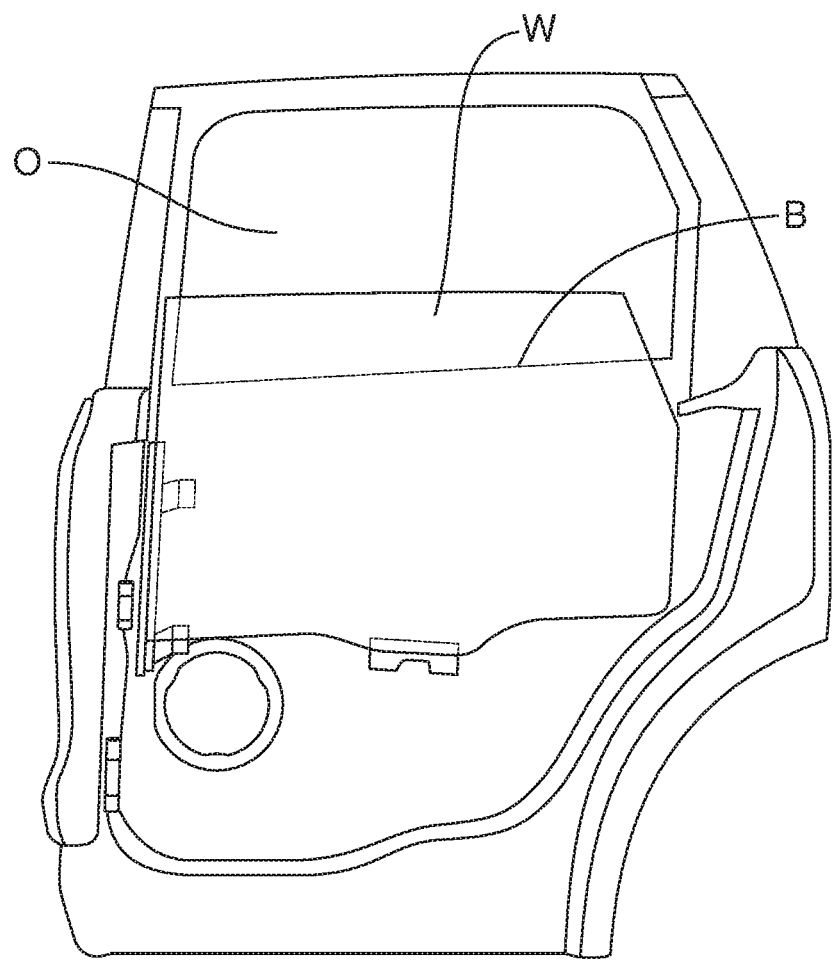
FIG. 1A illustrates one type of prior art compromise made when a door panel will not accommodate fully opening a full-sized window or door glass.
Figure 1B:
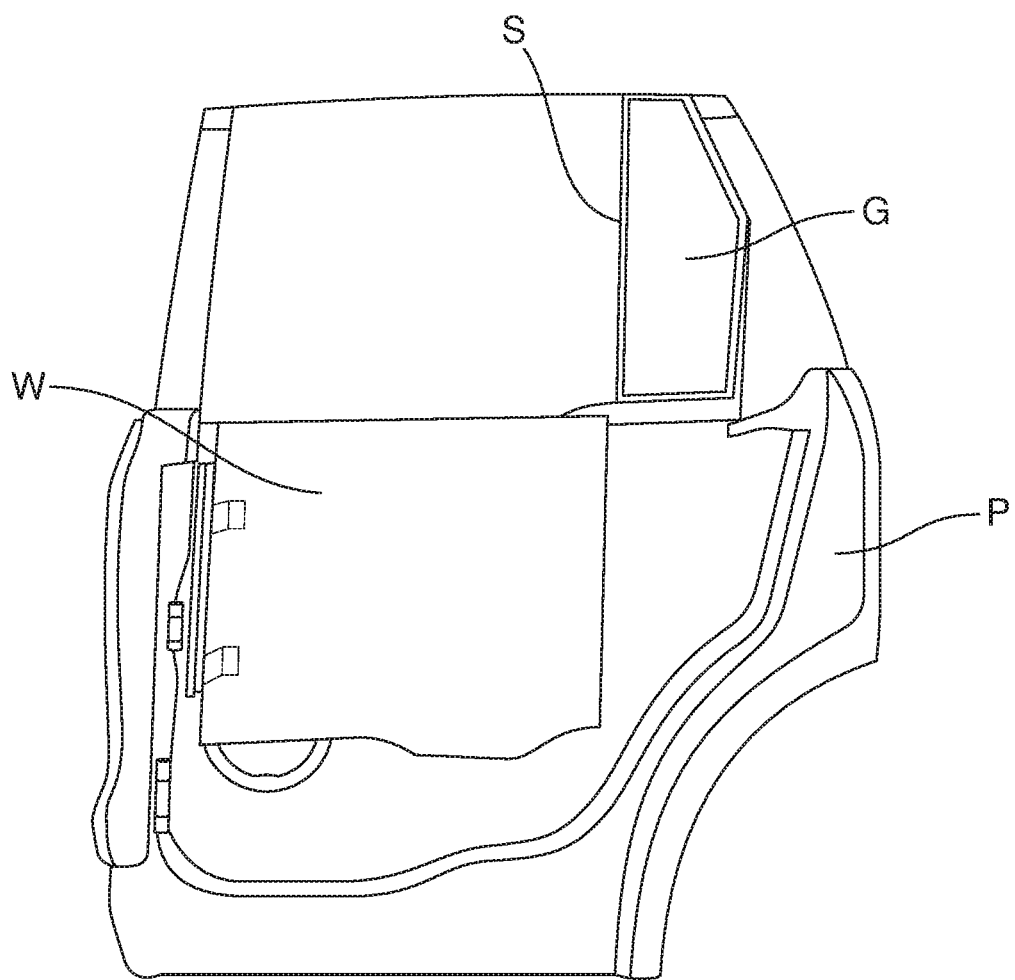
FIG. 1B illustrates a second type of prior art compromise when a door panel will not accommodate fully opening a full-size window or door glass.
Figure 2:
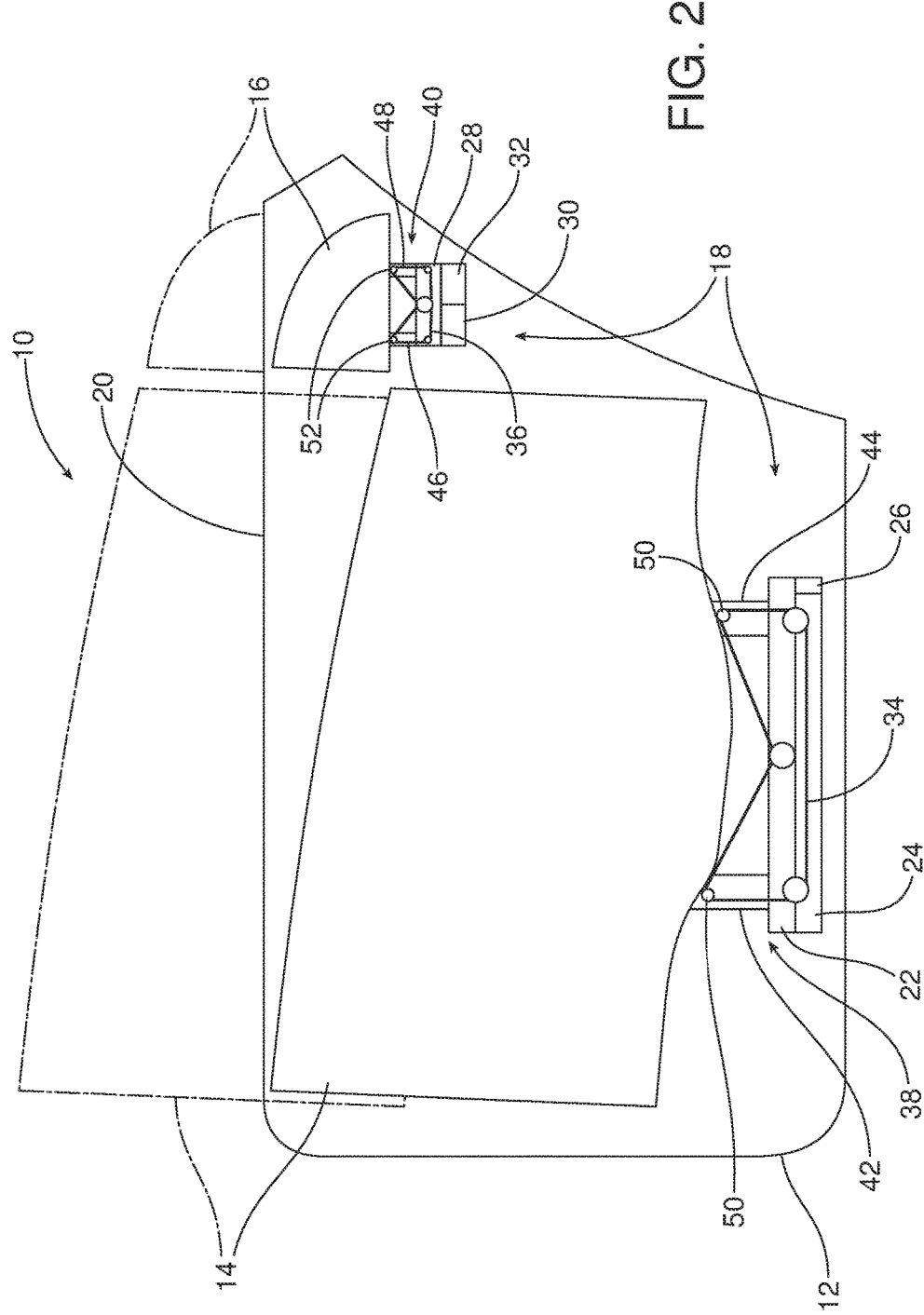
FIG. 2 is a schematic illustration of a motor vehicle door including a door body, first and second windows and a window drive system for independently displacing the first and second windows between closed and opened positions. In this embodiment, both the first and second windows are translated.

Reference is now made to FIG. 2 which schematically illustrates a first possible embodiment of a motor vehicle door 10. That motor vehicle door 10 includes a door body 12. A first or side window 14 and a second or quarter window 16 are both carried on the door body 12 with the quarter window adjacent to and vehicle rearward of the side window. A window drive system, generally designated by reference numeral 18 is also carried on the door body 12. That window drive system 18 functions to independently displace the first window 14 and the second window 16 between the closed positions illustrated in phantom line and the opened positions illustrated in full line. As should be appreciated, when the first and second windows 14, 16 are fully opened, they are fully or completely concealed in the door body 12 beneath the belt line 20. As should also be appreciated, in the illustrated embodiment the first window 14 and the second window 16 are of the frameless type.

As further illustrated in FIG. 2, the window drive system 18 includes a first drive motor 22 for opening and closing the first window 14. The first drive motor 22 is controlled by means of the controller 24 which may take the form of a dedicated microprocessor or an electronic control unit (ECU) operating in accordance with appropriate control software. A first actuator 26 connected to the controller 24 provides a human interface by which an operator may open and close the first window 14.

The window drive system 18 also includes a second drive motor 28 for opening and closing the second window 16. The second drive motor 28 is controlled by a controller 30 which may be of the same type as controller 24. The controller 30 is connected to a second actuator 32, which functions as a human interface for an operator to open and close the second window 16 as desired. A first linkage, in the form of a cable 34, connects the first drive motor 22 to the first window 14 while a second linkage or cable 36 connects the second drive motor 28 to the second window 16.

As further illustrated in FIG. 2, a first guide track and follower subsystem 38 guides the first window 14 while the first window is being displaced by the first drive motor 22 between the closed position and the opened position. Similarly, a second guide track and follower subsystem 40 guides the second window 16 while the second window is being displaced by the second drive motor 28 between the closed position and the opened position. More specifically, the first guide track follower and subsystem 38 and the second guide track and follower subsystem 40 each include at least one guide track. In the illustrated embodiment the first guide track and follower subsystem 38 includes first and second guide tracks 42, 44 while the second guide track and follower subsystem 40 includes a third guide track 46 and a fourth guide track 48. Followers 50 secured to the first window 14 slide along the first and second guide tracks 42, 44 while followers 52 on a second window 16 slide along the third and fourth guide tracks 46, 48 when the windows are displaced between the opened and closed positions. As should be appreciated, in the first embodiment illustrated in FIG. 2, the first window 14 and the second window 16 are both translated between the fully opened and fully closed positions along a substantially vertical axis with the first window being translated over a greater distance than the second window.

Figure 3A:
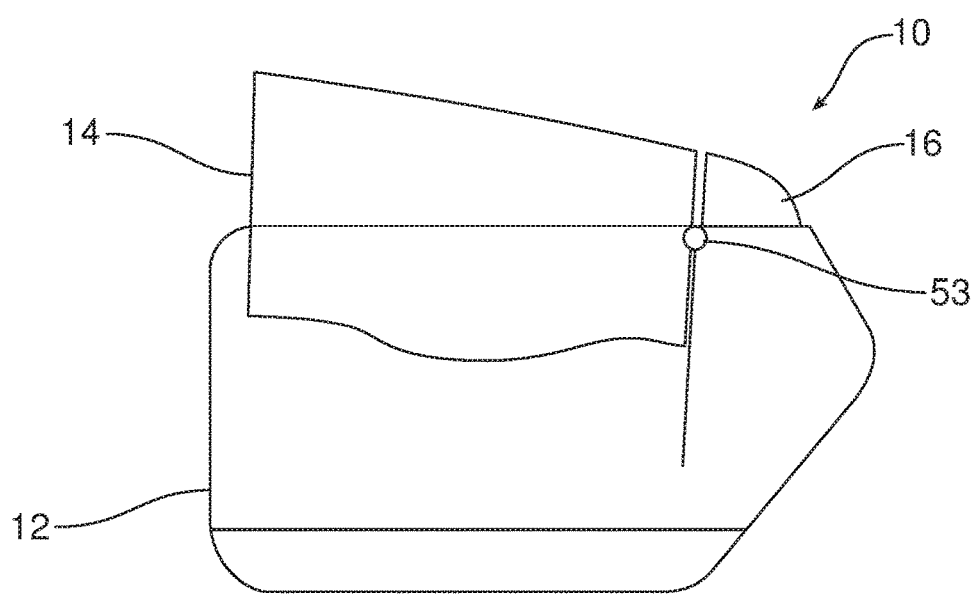
FIGS. 3A and 3B are schematic illustrations of an alternative embodiment respectively showing the first and second windows in the closed and opened positions. In this embodiment the first window is translated between the closed and opened positions and the second window is rotated between the closed and opened positions.
Figure 3B:
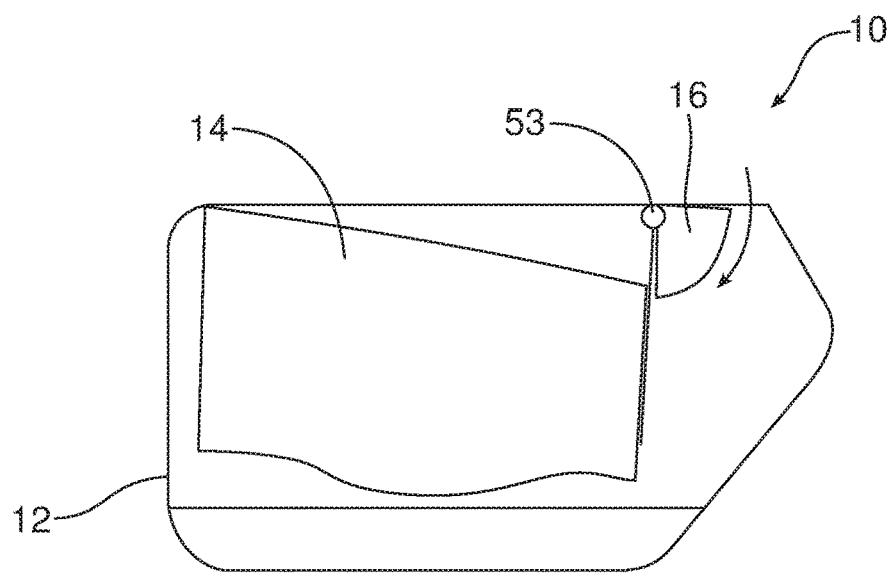

Reference is now made to FIGS. 3A and 3B which illustrate an alternative embodiment of motor vehicle door 10 wherein the first window 14 is translated between the opened and closed positions just as provided for in the first embodiment but the second window 16 is rotated between the open and closed positions about a pivot 53 when displaced between the opened and closed positions rather than translated. That pivot 53 may be fixed if desired.

Figure 4:
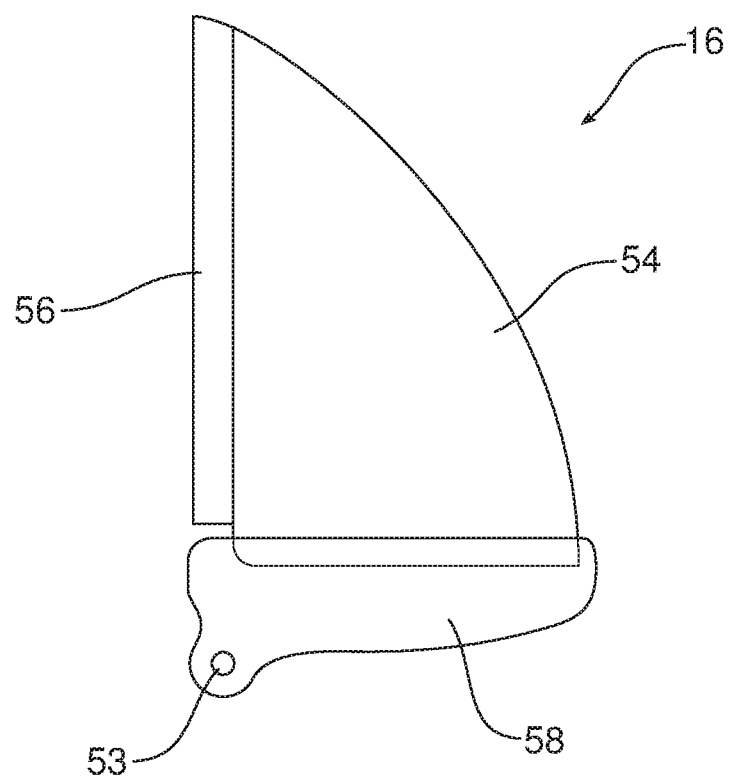
FIG. 4 is a detailed side elevational view of the quarter glass assembly including the quarter window, window bracket and seal.
Figure 4A:
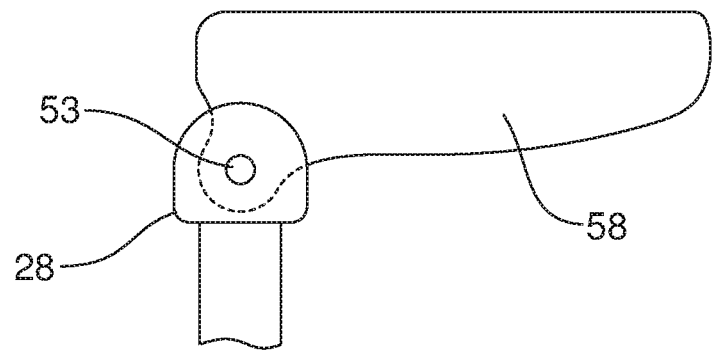
FIGS. 4A-4D are detailed views of four different linkages that may be used between the second drive motor and the glass bracket on the second window.

As illustrated in FIG. 4, the second window 16 comprises an assembly including a quarter glass 54, a seal 56 that seals the quarter glass 54 with the first window 14 when the two windows are in the closed position, and a window bracket 58 that is connected to the quarter glass 54 and pivots about the pivot pin 53 that is fixed on the door body 12.

Reference is now made to FIGS. 4A-4D illustrating four different drive systems for rotating the second window 16 between the closed and opened positions illustrated, respectively, in FIGS. 3A and 3B. In the embodiment illustrated in FIG. 4A, the drive motor 28 is directly connected to the pivot pin 53 and the window bracket 58 is keyed to that pin so that the drive motor directly drives the second window 16 between the opened and closed positions.

Figure 4B:
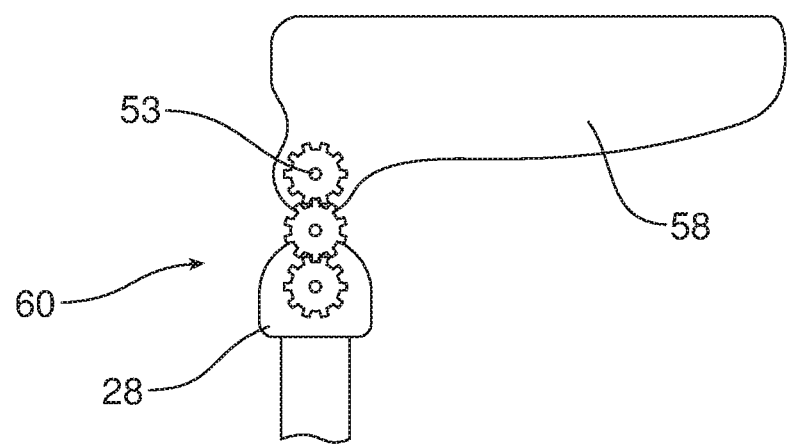

In the embodiment illustrated in FIG. 4B, the drive motor 28 is connected to a gear drive, generally designated by reference numeral 60, by which the drive motor rotates the pivot pin 53. Once again, the window bracket 58 is keyed to that pin 53 so that the window 16 is pivoted between the closed and opened positions.

Figure 4C:
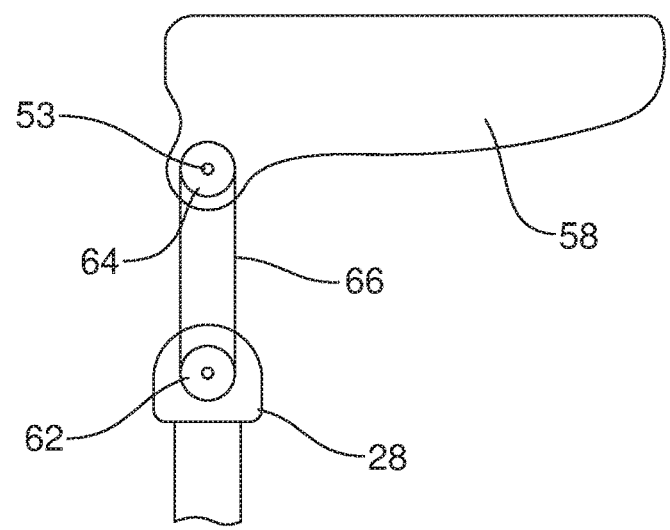

In the embodiment illustrated in FIG. 4C, the drive motor 28 is connected to the pivot pin 53 by means of the two pulleys 62, 64 and the drive cable, belt or chain 66. As a result, the motor 28 rotates the pivot pin 53 and the second window 16 keyed thereto to thereby displace the window between the opened and closed positions.

Figure 4D:
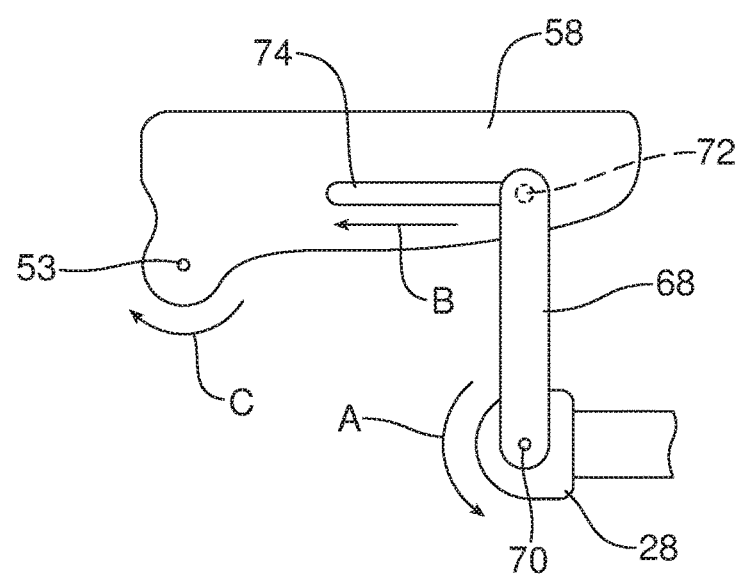

In yet another alternative embodiment illustrated in FIG. 4D, the motor 28 is connected by means of the slider crank 68 to the window bracket 58. More specifically, the drive shaft 70 of the drive motor 28 is keyed to the slider crank 68. The opposite end of the slider crank 68 includes a lug 72 that slides along an elongated slot 74 in the bracket 58. When the drive motor 28 pivots the slider crank 68 in the direction of action arrow A, the lug 72 slides along the slot 74 in the direction of action arrow B and the glass window bracket 58 is pivoted about the pivot pin 53 in the direction of action arrow C causing the second window 16 to be displaced from the closed position illustrated in FIG. 3A to the open position illustrated in FIG. 3B. When the drive motor 28 is driven in the opposite direction, the second window 16 is displaced from the opened position to the closed position in the opposite manner.

Figure 5A:
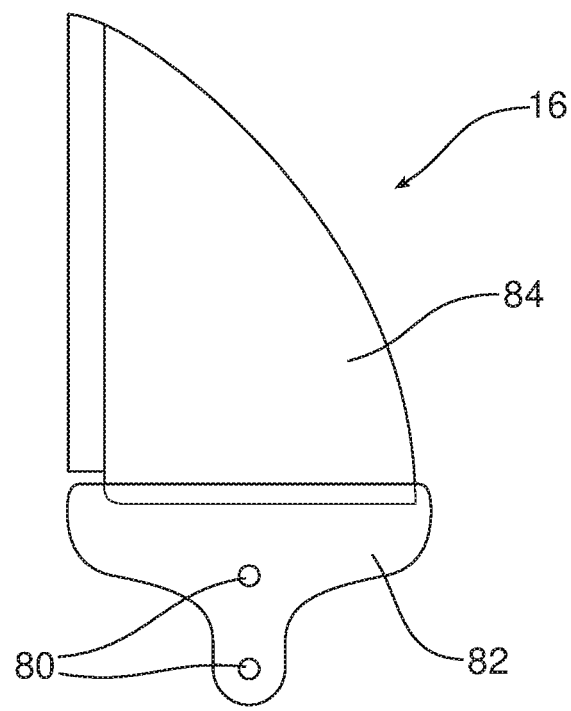
FIG. 5A is a partially exploded schematic view of an alternative embodiment for the guide track and follower subsystem of the second or quarter window.
Figure 5A:
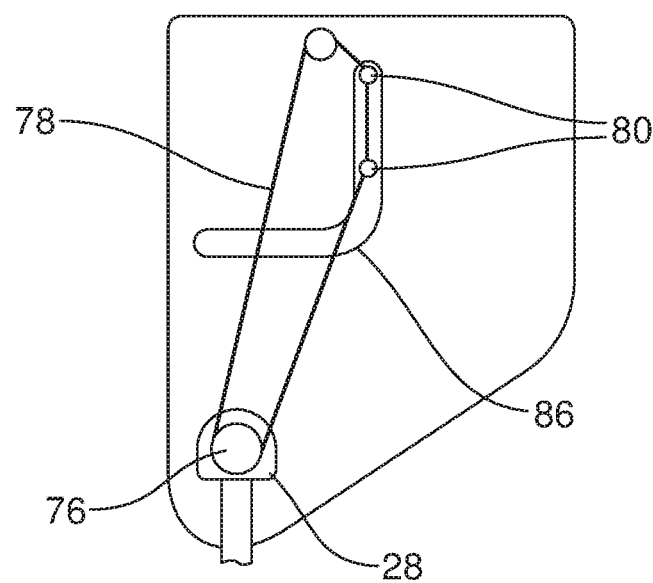
Figure 5C:
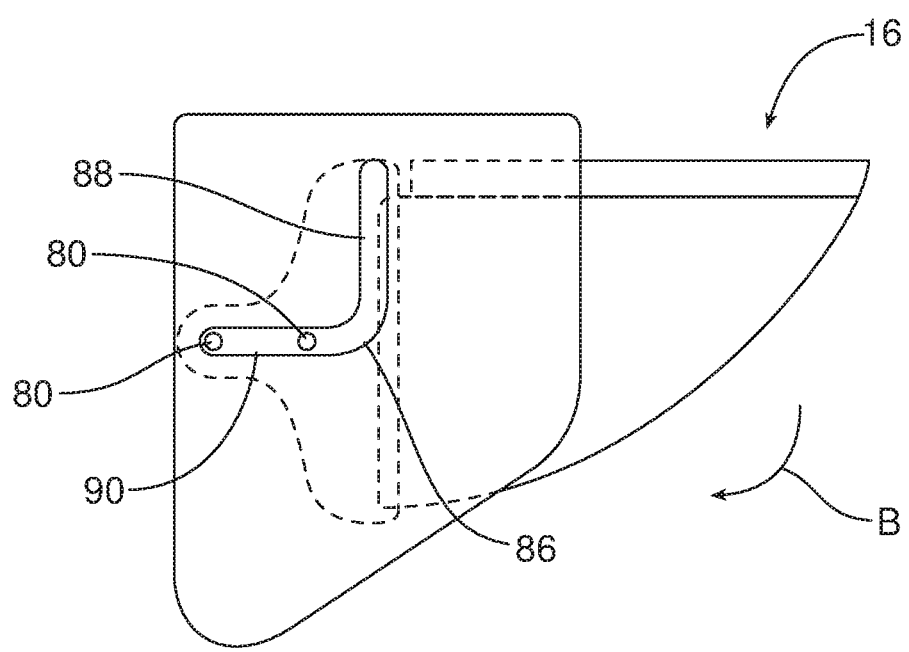
FIG. 5C is a schematic side elevational view of the embodiment illustrated in FIG. 5A with second window in the fully opened position.

Reference is now made to FIGS. 5A-5C illustrating yet another alternative embodiment. In this embodiment, the drive motor 28 drives the drum 76 about which the two ends of the drive cable 78 are wound. That cable 78 is connected to one or both followers 80 carried on the window bracket 82 which is connected to the quarter glass 84 of the second window 16. As should be appreciated, the followers 80 are received and slide along a substantially V-shaped guide track 86 that opens vehicle forward and is fixed to the door body 12. Thus, as the drive motor 28 is driven to displace the second window 16 from the closed position to the opened position that window is first translated downwardly in the direction of action arrow A and then pivoted clockwise in the direction of action arrow B as the followers 80 move from the first or substantially vertical section 88 of the V-shaped guide track 86 about the apex into the lower or angled section 90 of the V-shape guide track.

Consistent with this description, a method is also provided for improving rear seat ventilation in a motor vehicle. That method includes the steps of equipping a rear door 10 of a motor vehicle with a side window 14 and a quarter window 16 and providing a window drive system 18 for independently opening and closing the side window and quarter window. Thus, the method may include opening the side window 14 while maintaining the quarter window 16 closed by operator manipulation of the first actuator 26. Further, the method may include opening the quarter window 16 while maintaining the side window 14 closed by operator manipulation of the second actuator 32.

In addition, the method includes fully concealing the quarter window 16 below the belt line 20 within the body 12 of the rear door when in the fully opened position. Similarly, the method includes fully concealing the side window 14 below the belt line 20 within the body 12 of the rear door 10 when in a fully opened position.

As should be appreciated, a number of advantages result. The operator may choose to open only the side window 14, only the quarter window 16 or both the side window and quarter window in order to meet ventilation needs. Further, when fully opened, both the side window 14 and quarter window 16 are concealed fully within the door 12 so that the window opening is fully opened thereby providing a comfortable arm rest if desired. In addition, having both windows 14, 16 fully hidden within the door 12 provides improved aesthetics. This is especially true when the door 12 is opened as an exposed, fixed rear quarter window appears as a "fixed flag" above the beltline 24, providing an awkward appearance.

As should be further appreciated, the rear door 12 may be cut further back toward the upright portion of the rear seat. Since the second or quarter window 16 is contained within the door 12, a larger opening is provided for easier ingress and egress to the back seat.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. A motor vehicle door, comprising:
a door body;
a pivot pin fixed on the door body;
a first window carried on said door body;
a second window carried on said door body; and
a window drive system independently displacing said first window and said second window between a closed position and an opened position, wherein the first and second windows are fully concealed within the door body beneath a belt line when in said opened position, and wherein the window drive system includes a first drive motor and a first actuator connected to said first window and a second drive motor and a second actuator connected to said second window, wherein said second drive motor is connected to the pivot pin via a pulley system and a flexible drive element such that the second drive motor rotates the pivot pin to displace the second window between the open and closed positions.

2. The motor vehicle door of claim 1, wherein said first window and said second window are frameless.

3. The motor vehicle door of claim 1, wherein said first window is a side window and said second window is a quarter window located adjacent to and vehicle rearward of said side window.

4. The motor vehicle door of claim 3, wherein said window drive system further includes a first guide track and follower subsystem for said first window, said first guide track and follower subsystem guiding said first window while said first window is being displaced by said first drive motor between said closed position and said opened position.

5. The motor vehicle door of claim 4, wherein said window drive system includes a second guide track and follower subsystem for said second window, said second guide track and follower subsystem guiding said second window while said second window is being displaced by said second drive motor between said closed position and said opened position.

6. The motor vehicle door of claim 5, wherein said second guide track and follower subsystem includes:
at least one guide track fixed to said door body; and
a first follower and a second follower that are carried on said second window and slide along said at least one guide track as said second window is displaced by said second drive motor between said closed position and said opened position.

7. The motor vehicle door of claim 6, wherein said at least one guide track comprises a single fixed guide track and said first follower and said second follower both slide along said single fixed guide track.

8. The motor vehicle door of claim 1, wherein said flexible drive element is selected from a group consisting of a cable, a belt, and a chain.

9. A motor vehicle door, comprising:
a door body;
a pivot pin fixed on the door body;
a first window carried on said door body;
a second window carried on said door body;
a window drive system independently displacing said first window and said second window between a closed position and an opened position, wherein the first and second windows are fully concealed within the door body beneath a belt line when in said opened position, and wherein the window drive system includes a first drive motor and a first actuator connected to said first window and a second drive motor and a second actuator connected to said second window, wherein said second drive motor is connected via a slider crank to a slot carried on the second window such that the second drive motor displaces the second window between the opened and closed positions around the pivot pin.

10. A motor vehicle door, comprising:
a door body;
a first window carried on said door body;
a second window carried on said door body; and
a window drive system independently displacing said first window and said second window between a closed position and an opened position, wherein the first and second windows are fully concealed within the door body beneath a belt line when in said opened position, and wherein the window drive system includes a first drive motor and a first actuator connected to said first window and a second drive motor and a second actuator connected to said second window, wherein said window system includes a first guide track and follower subsystem for said first window and a second guide track and follower subsystem for said second window, said second guide track and follower subsystem includes: (i) a V-shaped guide track fixed to said door body; (ii) a first follower and a second follower that are carried on said second window, whereby the second drive motor drives a drum about which a cable is wound such that the first and second followers slide along the V-shaped guide track to displace the second window between an open and a closed position.

* * * * *